US009147263B2

(12) United States Patent
Gervais et al.

(10) Patent No.: US 9,147,263 B2
(45) Date of Patent: Sep. 29, 2015

(54) REVERSIBLE METHOD FOR TRANSCRIBING A FILE ENCODED WITH A FIRST CODING INTO A FILE ENCODED WITH A SECOND CODING

(71) Applicant: I-CES (INNOVATIVE COMPRESSION ENGINEERING SOLUTIONS), Paris (FR)

(72) Inventors: Than Marc-Eric Gervais, Paris (FR); Bruno Loubet, Paris (FR); Nicolas Bessou, Sartrouville (FR); Yves Guimiot, Conflans Sainte Honorine (FR); Mickael Petitfils, Mitry-Mory (FR)

(73) Assignee: I-CES (INNOVATIVE COMPRESSION ENGINEERING SOLUTIONS), Paris (FR)

( * ) Notice: Subject to any disclaimer, the term of this patent is extended or adjusted under 35 U.S.C. 154(b) by 99 days.

(21) Appl. No.: 13/722,364

(22) Filed: Dec. 20, 2012

(65) Prior Publication Data

US 2014/0112590 A1    Apr. 24, 2014

(30) Foreign Application Priority Data

Oct. 19, 2012    (FR) ...................................... 12 59998

(51) Int. Cl.
| | |
|---|---|
| *G06K 9/36* | (2006.01) |
| *G06T 9/00* | (2006.01) |
| *H04N 19/46* | (2014.01) |
| *H04N 19/60* | (2014.01) |
| *H04N 19/593* | (2014.01) |
| *H04N 19/40* | (2014.01) |

(52) U.S. Cl.
CPC .................. *G06T 9/00* (2013.01); *H04N 19/40* (2014.11); *H04N 19/46* (2014.11); *H04N 19/593* (2014.11); *H04N 19/60* (2014.11)

(58) Field of Classification Search
CPC ................ H04N 1/41; H04N 7/26491; H04N 19/00048; H04N 19/00127; H04N 19/00145; H04N 19/00266; H04N 19/00327; H04N 19/00369; H04N 19/00381; H04N 19/00387; H04N 19/00442; H04N 19/00472; H04N 19/00478; H04N 19/00484; H04N 19/0049; H04N 19/00533; H04N 19/00545; H04N 19/00721; H04N 19/00757; H04N 19/00775; H04N 19/00818; H04N 19/00884; H04N 19/00903; H04N 19/00951; H04N 21/234309; H04N 21/23439; H04N 21/23608; G06F 11/1068; G06F 11/1433; H04L 67/2828; H04L 67/2852; H04L 67/36; H04L 69/04; G06T 9/00; G06T 9/007; G11B 27/034
See application file for complete search history.

(56) References Cited

U.S. PATENT DOCUMENTS 6,112,250 A  *   8/2000   Appelman ..................... 709/247
6,141,447 A  *  10/2000   Linzer et al. .................. 382/236
(Continued)

FOREIGN PATENT DOCUMENTS

WO            2012059124 A1        5/2012

*Primary Examiner* — Jose Couso
(74) *Attorney, Agent, or Firm* — Young & Thompson

(57) ABSTRACT

A method for reversible coding of an image, including extracting compression information from an image compressed in an original format, at least partly decompressing the compressed image into an intermediate at least partly decompressed image, re-encoding the intermediate image into a re-encoded image, and preferably associating in a same file, the re-encoded image with compression information.

8 Claims, 1 Drawing Sheet

(56) References Cited

U.S. PATENT DOCUMENTS

| | | |
|---|---|---|
| 7,254,272 B2 * | 8/2007 | Mitchell et al. ............... 382/233 |
| 7,502,514 B2 * | 3/2009 | Gringeler et al. ............. 382/232 |
| 8,201,054 B2 * | 6/2012 | Slyz et al. ..................... 714/773 |
| 2004/0066973 A1 | 4/2004 | Prakash et al. |
| 2006/0104526 A1 | 5/2006 | Gringeler et al. |

* cited by examiner

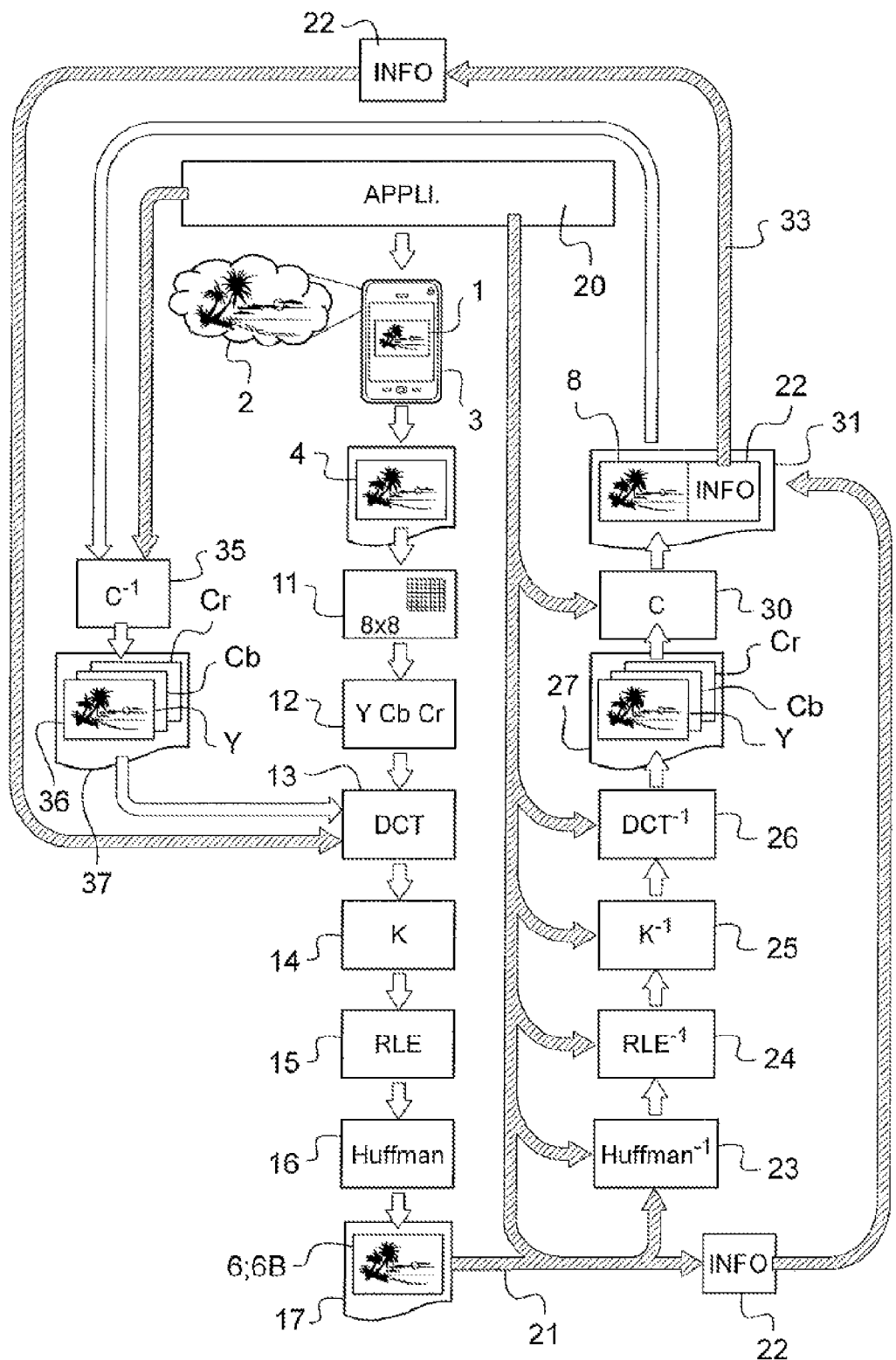

REVERSIBLE METHOD FOR TRANSCRIBING A FILE ENCODED WITH A FIRST CODING INTO A FILE ENCODED WITH A SECOND CODING

FIELD

The present invention relates to the field of encoding a file, for example an image, notably with view to its compression.

BACKGROUND

A user generally gains possession of an image in two ways; either by downloading this image, or by taking a photograph. The image obtained is ordinarily obtained in a compressed form. The encoding format is imposed, either by the image capture device, or by the provider of the downloaded image, if necessary. However, such a format may not be able to be used by certain software packages or may be in an insufficiently compressed format; having a high compression level is essential when the number of photographs is large, or when the available memory space is small, which is notably the case of portable devices such as digital cameras, cell phones or digital tablets. On the other hand, it may be interesting to keep a photograph in its original format, notably if it is a widespread format such as the JPEG (acronym of Joint Photographic Expert Groups) format, such as it was downloaded or recorded during the image capture; which is contradictory notably with a need for saving space.

SUMMARY

A method according to the invention, for encoding an image comprises:
- a step for extracting compression information from a file compressed in an original format;
- a step for at least partly decompressing the compressed file into an intermediate at least partly decompressed file;
- a step for re-encoding said intermediate file into a re-encoded file; and,
- a step for associating said re-encoded file with compression information.

In the case of an image, the method according to the invention comprises:
- a step for extracting compression information from an image compressed in an original format;
- a step for at least partly decompressing the compressed image into an intermediate at least partly decompressed image;
- a step for re-encoding said intermediate image into a re-encoded image; and,
- a step for associating, preferably in a same file, said re-encoded image with the compression information.

Such a method advantageously further comprises:
- a step for restoring an intermediate image from the re-encoded image; and, even more advantageously,
- a step for restoring an image re-compressed according to the original format, from the restored intermediate image and said compression information.

Advantageously, this method may be suitable for an original compression format which is JPEG. Notably if the original format is JPEG, the intermediate image is advantageously of the YCbCr type.

Advantageously, the step for re-encoding the intermediate image uses an encoding of the type of the one, object of international patent application WO 2012/059124, from the same Applicant, such that, for a sequence of initial digital values of the intermediate image and for a first initial value of the sequence, the compressed value of the first value is equal to the first value, and then for each initial current value, the following steps are carried out:
- the difference between the current initial value and the decompressed value of the initial value which immediately precedes the current value is calculated; and then,
- a compressed value of said difference is calculated by means of a compression function; and then,
- the decompressed value corresponding to said initial current value is calculated; and then,
- the three preceding steps are applied to the immediately following value if one exists; and,
- a compressed sequence of values is formed, each corresponding to a respective initial value.

Advantageously, such an encoding, or another one gives the possibility of consequently reducing the weight of the image, without any perceivable quality loss. By keeping the compression parameters, it is then possible, if the image has to be shared in its original compression format, to restore a recompressed image according to the original format, very close to the original, both in weight and in quality.

The invention also relates to an application for a portable device, notably for a smartphone, which applies a method according to the invention.

BRIEF DESCRIPTION OF THE DRAWINGS

Several embodiments of the invention will be described hereafter, as non-limiting examples, with reference to the appended drawings wherein:

FIG. 1 is an illustration of a method according to the invention.

DETAILED DESCRIPTION

A method according to the invention will be described in its application to digital compression of an image. In this example, the original image is a photograph 1 of a landscape 2 taken with a portable device 3. The portable device may be any mobile or portable device, such as a mobile telephone, a tablet computer, or any other suitable portable device. The photograph 1 is first transformed into a raw image matrix 4 in RGB (Red Green Blue) components, and then automatically transformed by the telephone 3 into a compressed image 6 in a compression format, here the <<JPEG>> format (acronym of Joint Photographic Experts Groups). The JPEG formatting comprises the following compression steps:
- cutting out 11 the raw image into blocks of 8 by 8 pixels;
- transforming 12 the RGB components of the image into a luminance component Y and two chrominance components Cb and Cr;
- performing a DCT (Discrete Cosine Transform) transformation 13,
- quantification 14;
- coding 15 of the RLE (Run Length Coding) type; and then
- binary coding 16, for example of the Huffman type, in the case of the JPEG format;

so that, following these steps 11, 16, the raw image 4 is transformed into a compressed image 6, thus stored in a file 7 in the memory of the telephone 3.

The invention proposes an application 20 which notably allows an improvement in the storage capacities of the telephone 3. The application 20 may be downloaded and stored on a non-transitory computer readable medium, for example from an on-line store/shop, notably of the type presently known under the names of <<Apple Store™>> or <<Play Store™>>; alternatively, the application may be native, i.e. originally provided with the telephone, still alternatively, the application may be available on a chip (for example of the type equipping a <<SIM card>>) provided by a telephone operator.

In the illustrated example, the application 20 according to the invention gives the possibility of proposing to transform the compressed image 6 into a re-encoded image 8. In the illustrated example, the re-encoded image 8 has a larger compression level than that of the compressed image 6, i.e. the weight of the re-encoded image 8, measured in bits, is lower than that of the compressed image 6. The action of the application 20, without this being limiting, may be:

- targeted, i.e. the user selects from the compressed images which he/she has on his/her device 3, his/her telephone here, the image intended to be processed by the application;
- on demand, i.e. the user voluntarily starts the application so that the latter searches in the memory of the device 3, a file 7 which may be processed by the application, either automatically or not;
- automatic, i.e. the application automatically engages the processing of each of the photographs 1 taken by the device 3, without any intervention from the user, in a concealed way.

The application according to the invention allows reversibility of the processing. As particularly illustrated in the FIGURE, the application 20 automatically successively performs the following steps:

- first of all, a step 21 for detecting and reading the file 7 corresponding to the compressed image 6; and then,
- the application 20 extracts from the file 7, information 22 relating to the compression 11-16 with which it was possible to obtain the compressed image 6 from the raw image 4, noted as <<INFO>> in the FIGURE, and keeps said information 22 in memory;
- the application 20 exerts decompression steps 23-27; and then,
- re-encoding 30 so as to obtain the re-encoded image 8; and then,
- associating in a same file 31, the thereby re-encoded image 8 and information 22.

In the illustrated case, i.e. that of a JPEG-compressed image 6, the information 22 essentially comprises the tables used for the quantification 14. This information 22 is contained in the header of the file 7 and allows restoration of the image in a form very close to the original compressed image 6, for example its display on a screen, for example that of the telephone 3.

The decompression steps 23-26 are partial, and include in the illustrated case:

- inverse binary coding 23, for example of the inverse Huffman type, in the case of the JPEG format; and then,
- coding 24 of the inverse RLE type; and then,
- inverse quantification 25; and then,
- inverse DCT transformation 26.

The inverse operations 23-26 are noted in the FIGURE like the direct operations 13-26, however added with the exponent <<−1>>.

Consequently, an intermediate image 27 is obtained, comprising again the three components of the image, i.e. the luminance Y component and both chrominance components Cb and Cr substantially identical with those obtained in the compression step 12, to within the errors inherent to the JPEG process.

The three components, Y, Cb, Cr of the intermediate image 27 are re-encoded during a subsequent step 30 by an encoder C of the application 20. The encoder C, in the illustrated example, is such that a file 31 containing the re-encoded image 8 and the compression information 22, has a lower weight than that of the compressed file 7 comprising the compressed image 6. Preferably, an encoder is used of the type of the one, object of the international patent application WO 2012/059124, of the same Applicant.

The encoding format C may be a proprietary format, i.e. it may not be generalized, therefore incompatible with programs or applications, harbored in the telephone 3 or accessible from the telephone 3, or further harbored by a device other than the telephone 3.

Thus, the application allows reversibility of the encoder C. During this inverse operation, the information 22 of the re-encoded file 31 is extracted 33 and decoding $C^{-1}$ is performed 35 which allows restoration of an image 36 formed with three components Y, Cb and Cr, substantially identical with those obtained in the compression step 12, to within the errors inherent to the JPEG process cumulated with those of the encoding/decoding $C/C^{-1}$. Preferably, the re-encoded file 31, the re-encoded image 8 and the information 22 which it contains are kept with the purpose of optimized storage.

A procedure for re-compressing the image 36 to the JPEG format is then resumed, from the decoded file 37 comprising the decoded image 36 in the YCbCr format, by directly beginning with step 13 for DCT transformation; and then, by using the compression information 22, by continuing with the quantification 14, and then the coding 15 of the RLE type and the coding of the Huffman type 16. A recompressed image 6B close to and of the same format as the compressed image 6 obtained earlier, is thereby obtained.

Of course, the recompressed image 6B is not intended to be re-encoded according to the steps 21, 23-26, 30 described earlier, but it is intended to be used or transmitted to another device in a universal format, the JPEG format here. The recompressed image 6B, once used and/or transmitted, may be automatically destroyed, the re-encoded file 31, the re-encoded image 8 and the information 22 which it contains, being kept, with a purpose of optimized storage. Thus, in an optimized case, only one or several images used at a given instant are in a recompressed condition in the original JPEG format, the other ones remaining in the re-encoded format C, the weight of the compressed images thus being optimized.

Of course, the invention is not limited to the examples which have just been described.

Thus, reversible re-encoding may be used for reasons other than the optimization of the weight of files.

Although described with reference to an image, a method according to the invention is applicable to any compressed or compressible, digital file, also notably to a video file or an audio file.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" means any one or more microprocessors, central processing units (CPUs), computing devices, microcontrollers, digital signal processors, or like devices.

The term "computer-readable medium" refers to any non-transitory medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of non-transitory computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G. Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The invention claimed is:

1. A method for encoding a file, comprising:
   extracting, via a processor device, original compression information from a file comprising a digital image compressed in an original format;
   at least partly decompressing, via the processor device, the digital image into an intermediate at least partly decompressed digital image at a raw YCbCr format;
   re-encoding, via the processor device, said intermediate at least partly decompressed digital image into a re-encoded digital image; and
   associating, via the processor device, in a same file, said re-encoded digital image with said original compression information.

2. The method according to claim 1, further comprising:
   restoring, via the processor device, an intermediate digital image from the re-encoded digital image.

3. The method according to claim 2, further comprising:
   restoring, via the processor device, a compressed digital image according to the original format, from the restored intermediate digital image and from said original compression information.

4. The method according to claim 3, wherein the original compression format is a JPEG format.

5. The method according to claim 4, wherein the intermediate image is an YCbCr image.

6. A method for encoding a file, comprising:
   extracting, via a processor device, original compression information from a file comprising a digital image compressed in an original format;
   at least partly decompressing, via the processor device, the digital image into an intermediate at least partly decompressed digital image;
   re-encoding, via the processor device, said intermediate at least partly decompressed digital image into a re-encoded digital image; and
   associating, via the processor device, in a same file, said re-encoded digital image with said original compression information,
   wherein the step for re-encoding the intermediate digital image uses an encoding such that, for a sequence of initial digital values of the intermediate digital image and for a first initial value of the sequence, the compressed value of the first value is equal to the first value, and then, for each initial current value, the following steps are carried out:
     calculating, via the processor device, a difference between a current initial value and a decompressed value of the initial value which immediately precedes the current value; and then,
     calculating, via the processor device, a compressed value of said difference by executing a compression function; and then,
     calculating, via the processor device, the decompressed value corresponding to said initial current value; and then,
     applying, via the processor device, the three preceding steps of calculating to an immediately following value if one exists; and
     forming, via the processor device, a compressed sequence of values, each corresponding to a respective initial value.

7. An application for a portable device, comprising:
   a set of instructions embodied on a non-transitory computer readable medium for executing the method according to claim 1 when run on a computer processor device.

8. An application for a portable device, comprising:
a set of instructions embodied on a non-transitory computer readable medium for executing the method according to claim 6 when run on a computer processor device.

\* \* \* \* \*